Jan. 7, 1936.  T. P. CHASE  2,026,611
COMPOSITE PISTON
Original Filed April 15, 1929
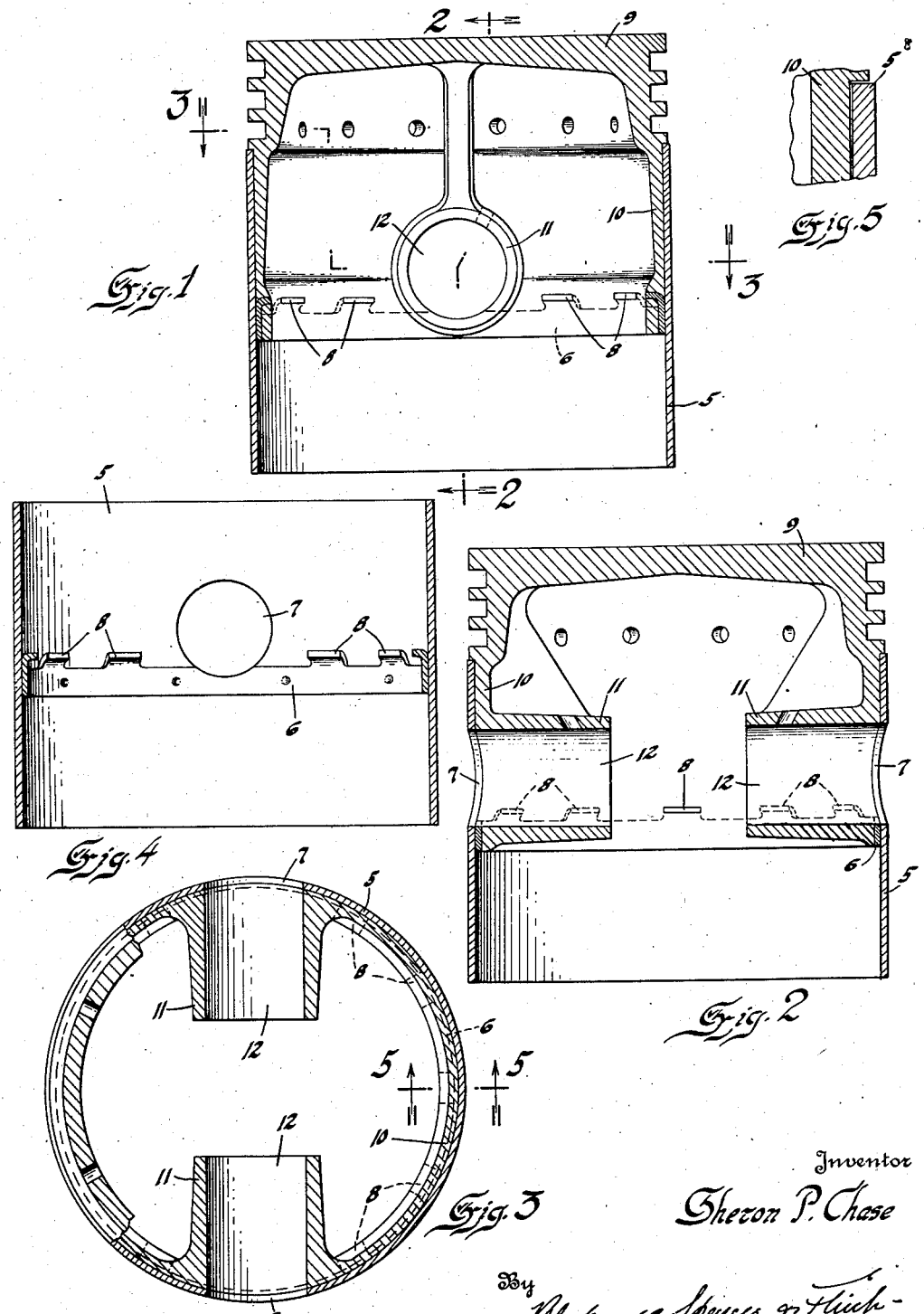
Inventor
Sheron P. Chase
By Blackmore, Spencer & Fluch
Attorneys Patented Jan. 7, 1936

2,026,611

UNITED STATES PATENT OFFICE 2,026,611

COMPOSITE PISTON

Theron P. Chase, Detroit, Mich., assignor, by mesne assignments, to General Motors Corporation, Detroit, Mich., a corporation of Delaware Application April 15, 1929, Serial No. 355,269
Renewed May 27, 1933

1 Claim. (Cl. 309—14)

This invention relates to composite pistons.

By the term "composite piston" is meant a piston of the type of which the head or the body is made of a light metal or alloy, such as aluminum or an alloy of aluminum, and the skirt or the bearing surfaces are made of a harder, wear-resisting metal, such as iron or steel.

On account of the difference between the temperature coefficients of expansion of the metals or alloys of which the head or the body and the skirt or the bearing surfaces of such pistons are made, in composite pistons as heretofore constructed, there has been either (1) a tendency for the parts to become loose and rattle at ordinary atmospheric temperatures, or (2) a tendency for the piston to bind in the cylinder at ordinary operating temperatures. It is the principal object of this invention to produce a composite piston of which the parts will not become loose and rattle at ordinary atmospheric temperatures and which will not bind in the cylinder at ordinary operating temperatures.

For a more complete understanding of the nature and the objects of my invention, reference is made to the following specification, in which is described the preferred embodiment of my invention which is shown in the accompanying drawing.

In the accompanying drawing:

Fig. 1 is a longitudinal cross-section, in a plane at a right angle to the axis of the wrist pin bosses, through a piston in which is embodied my invention.

Fig. 2 is a section taken on the line 2—2 of Fig. 1.

Fig. 3 is a section taken on the line 3—3 of Fig. 1.

Fig. 4 is a longitudinal cross-section, through the skirt or bearing sleeve, taken in a plane at a right angle to the axis of the wrist pin openings.

Fig. 5 is an enlarged fragmentary section, taken on the line 5—5 of Fig. 3 and showing, on an exaggerated scale, the space between the skirt or bearing sleeve and the body of the piston at ordinary atmospheric temperatures.

In the accompanying drawing, the reference character 5 indicates the skirt or bearing sleeve of the piston, and the reference character 6 a ring circumferentially secured, preferably by welding, to the interior of the skirt or bearing sleeve intermediate its ends. The skirt or bearing sleeve 5 is preferably made of high carbon steel and the ring 6 of any suitable material, such as steel. There are provided in the skirt or bearing sleeve, intermediate its ends, diametrically opposed openings 7, and on the ring 6, intermediate the openings 7, a plurality of substantially horizontally disposed, inwardly extending prongs 8.

The body of the piston is made of a light metal or alloy, such as aluminum or an alloy of aluminum, and, as shown in the drawing, consists of a head 9 and a depending annular wall portion 10 which is integral with the head. Adjacent the open end of the body, there are formed on the annular wall portion 10 diametrically opposed, inwardly extending wrist pin bosses 11 through which extend openings 12 which are coaxial with the openings 7 in the skirt or bearing sleeve. The body and the skirt or bearing sleeve are secured together by means of the prongs 8 which are embedded in the thickened portion of the lower end of the annular wall portion 10.

The skirt or bearing sleeve 5 may be formed by any suitable process and the ring 6 is preferably secured thereto by welding. To complete the piston, the skirt or bearing sleeve is placed in a suitable mold—preferably a permanent mold—and the mold and skirt or bearing sleeve heated to such a temperature that, when the completed piston is cooled to ordinary atmospheric temperatures, the skirt or bearing sleeve and the body portion will be spaced apart a short distance radially, as shown in Fig. 5, and that, when the completed piston is at ordinary engine operating temperatures, the skirt or bearing sleeve and the body portion will contact circumferentially without the body portion exerting sufficient pressure radially against the skirt or bearing sleeve to expand it to a diameter greater than that which it would normally assume at that temperature. After the mold and the skirt or bearing sleeve have been heated to the desired temperature, the molten metal of which the body is to be formed, is introduced into the mold, and thus the body portion is formed and becomes interlocked with the skirt or bearing sleeve 5 by the prongs 8 which become embedded in the metal of the head.

By heating the skirt or bearing sleeve 5 to the temperature mentioned above, before the molten metal of which the body is to be formed is cast thereinto, it is insured that, when the piston is at ordinary engine operating temperatures, there will be no tendency for the expansion of the body to affect the expansion of the skirt or bearing sleeve and cause binding of the piston in the cylinder. At lower temperatures, such as those at which the piston operates when the engine is being started from the cold, the body will tend to withdraw radially from the skirt or bearing sleeve by sliding inwardly on the prongs 8 on the ring 6. The provision of a plurality of these prongs 8, each of which enters the body at a different angle, prevents the body and the skirt or bearing sleeve from becoming loose and rattling under such conditions.

When the engine in which my piston is used is first started, the body will become heated very quickly and will, therefore, expand quickly until it is in circumferential contact with the skirt or bearing sleeve, for until the body and skirt are in circumferential contact the rate of heat transfer between the body and skirt or bearing sleeve is obviously quite low. This feature is a highly desirable one since it is thereby insured that for no great length of time, while the engine is operating, will the prongs 8 be required to function as the sole connecting means between the head and the skirt or bearing sleeve.

Although I have shown and described a preferred embodiment of my invention, it is to be understood that this has been done by way of example, and not by way of limitation, and that the scope of my invention is to be determined only by the appended claim.

I claim:

In a composite piston, a circumferentially continuous bearing sleeve of wear resisting sheet metal or alloy, a cup shaped body of a light metal or alloy which has a higher temperature coefficient of expansion than the metal or alloy of which the bearing sleeve is made and whose open end extends well into the bearing sleeve, a ring which is located within the bearing sleeve and secured to it between its ends, and spaced approximately horizontal projections on the ring and embedded in the cup shaped body.

THERON P. CHASE.